United States Patent
Kersey et al.

(10) Patent No.: US 11,325,169 B2
(45) Date of Patent: May 10, 2022

(54) METHODS FOR USING AN INTEGRATED SCRAPER-SPONGE

(71) Applicant: Sani Products, Inc., Eugene, OR (US)

(72) Inventors: Jamie Kersey, Eugene, OR (US); Daniel Biagi, Eugene, OR (US)

(73) Assignee: Sani Products, Inc., Eugene, OR (US)

(*) Notice: Subject to any disclaimer, the term of this patent is extended or adjusted under 35 U.S.C. 154(b) by 0 days.

(21) Appl. No.: 17/110,269

(22) Filed: Dec. 2, 2020

(65) Prior Publication Data

US 2021/0101187 A1 Apr. 8, 2021

Related U.S. Application Data

(63) Continuation-in-part of application No. 16/547,542, filed on Aug. 21, 2019, now Pat. No. 10,882,083.

(51) Int. Cl.
| | |
|---|---|
| *B08B 1/00* | (2006.01) |
| *A47L 13/12* | (2006.01) |
| *A47L 13/16* | (2006.01) |
| *A47L 13/08* | (2006.01) |
| *B08B 7/04* | (2006.01) |
| *A47L 13/03* | (2006.01) |

(52) U.S. Cl.
CPC ............... *B08B 7/04* (2013.01); *A47L 13/03* (2013.01); *A47L 13/08* (2013.01); *A47L 13/12* (2013.01); *A47L 13/16* (2013.01); *B08B 1/005* (2013.01); *B08B 1/006* (2013.01)

(58) Field of Classification Search
CPC .......... A47L 13/08; A47L 13/12; A47L 13/16; B08B 1/00; B08B 1/001; B08B 1/003; B08B 1/005; B08B 1/006

USPC ................................................... D32/40
See application file for complete search history.

(56) References Cited

U.S. PATENT DOCUMENTS

| | | | | |
|---|---|---|---|---|
| 2,186,050 A | * | 1/1940 | Vaughn .................... | A47L 1/15 15/244.1 |
| 4,571,766 A | * | 2/1986 | Goldman ................. | A01K 63/10 15/105 |
| 4,724,568 A | * | 2/1988 | Englehardt ............. | A47L 13/02 15/105 |
| D464,472 S | * | 10/2002 | Haro ............................. | D32/40 |
| D604,469 S | * | 11/2009 | Rolstad .......................... | D32/40 |
| D708,805 S | * | 7/2014 | Mehdizadeh .................. | D32/40 |
| D745,234 S | * | 12/2015 | Brown ........................... | D32/40 |
| 2001/0044980 A1 | * | 11/2001 | Duplessis .............. | A47L 13/12 15/121 |
| 2008/0216260 A1 | * | 9/2008 | Silverman .............. | A47L 13/08 15/105 |
| 2014/0033462 A1 | * | 2/2014 | Song ...................... | A47L 17/08 15/229.11 |

(Continued)

FOREIGN PATENT DOCUMENTS

JP 2005224303 A * 8/2005

*Primary Examiner* — Randall E Chin
(74) *Attorney, Agent, or Firm* — Diana Mederos (57) ABSTRACT

Methods of using an integrated scraper-sponge having a scraper layer with and edge and fixed between the first and second sponge and/or abrasive layers. The scraper sponge is wetted and applied to a surface that is contaminated. The scraper-sponge is moved about the contaminated surface or dabbed onto the surface. The wet sponge portion loosens residue while the scraper edge scrapes residue from the surface as the scraper is moved about the contaminated surface.

3 Claims, 8 Drawing Sheets

(56) References Cited

U.S. PATENT DOCUMENTS

2014/0165317 A1\* 6/2014 Diener .................... A47L 13/12
15/229.11

\* cited by examiner

METHODS FOR USING AN INTEGRATED SCRAPER-SPONGE

RELATED APPLICATIONS

This application is a continuation-in-part of U.S. Non-provisional patent application Ser. No. 16/547,542 entitled Integrated Scraper-sponge having a filing date of Aug. 21, 2019, now U.S. Pat. No. 10,882,083, and which is a continuation-in-part of U.S. Non-provisional patent application Ser. No. 15/351,220 entitled Integrated Scraper-Sponge having a filing fate of Nov. 14, 2016, now U.S. Pat. No. 10,426,312, which claims the benefit of U.S. Provisional Patent Application No. 62/255,180 filed Nov. 13, 2015, the disclosures of which are hereby incorporated by reference.

BACKGROUND OF THE INVENTION

Field of the Invention

This invention relates to the field of methods of using cleaning implements integrating multiple functions including but not limited to wiping, scrubbing, and scraping.

Description of Related Art

The use of sponges for household and industrial cleaning is well known. Sponges provide a suitable medium for holding various types of soaps which are used to efficiently remove dirt, leftover food particles, oil, grease, and other contaminants from a surface. However, contaminants are oftentimes wholly or partially solidified on a surface simple wiping does not adequate remove the solidified particles.

Therefore, a need exists for a household item that remove the dirt and leftover food particles that a simple sponge fails to remove.

SUMMARY OF THE INVENTION

Methods of using an integrated scraper-sponge are provided. The integrated scraper-sponge includes a first sponge layer of absorbent material, and a second sponge or scrub layer of absorbent material or abrasive material. The first and second layers are mated to one another, for instance, with appropriate adhesive, at an interface. The layers are configured and dimensioned to define a sponge body having a first surface being a surface of the first sponge layer and a second surface being a surface of the second sponge or scrub layer, and a continuous side surface around the perimeter.

A scraper layer is fixed between the first and second layers at the interface thereof. The scraper layer includes a scraper edge portion protruding outwardly from a integrated scraper-sponge of the continuous side surface of the sponge body, a support structure body, and an interface portion. In certain embodiments, the support structure body has an area configured and dimensioned to fit between at least a major portion the interface. In additional embodiments, the support structure body includes a plurality of apertures within the area of the support structure body perimeter defining at the interface of the first and second layers. In further embodiments, the support structure body includes both an area configured and dimensioned to fit between at least a major portion the interface, and a plurality of apertures within the area of the support structure body.

In certain embodiments, the integrated scraper-sponge described herein comprises a flexible plastic scraper body having a plurality of apertures sandwiched between a cellulose or foam sponge on the bottom, and a nylon scrub pad on top, with the scraper extending out of an end.

In additional embodiments, the integrated scraper-sponge described herein comprises a flexible plastic scraper body sandwiched between substantial area of the interface between a cellulose or foam sponge on the bottom, and a nylon scrub pad on top, with the scraper extending out of an end.

In further embodiments, the extended portion of the scraper comprises a flat edge parallel to the end and having a length similar to the corresponding end dimension of the sponge, and with one corner in a curved configuration and the opposing corner in a pointed configuration, for scraping surfaces of various contours.

In further embodiments, a scraper layer insert has a plurality of openings. The openings allow viscous or semi rigid material such as liquid or dried glue to pass through. The openings are present at the distal portion of the support structure body.

Integrated scraper sponges are implemented by obtaining a scraper-sponge apparatus, wetting the sponge portion, removing excess liquid from the sponge, applying the sponge to a surface to loosen dirt

BRIEF DESCRIPTION OF THE DRAWINGS

The invention will be described in further detail below and with reference to the attached drawings in which the same or similar elements are referred to by the same or similar number, and where.

DETAILED DESCRIPTION OF THE INVENTION

Figure 1:
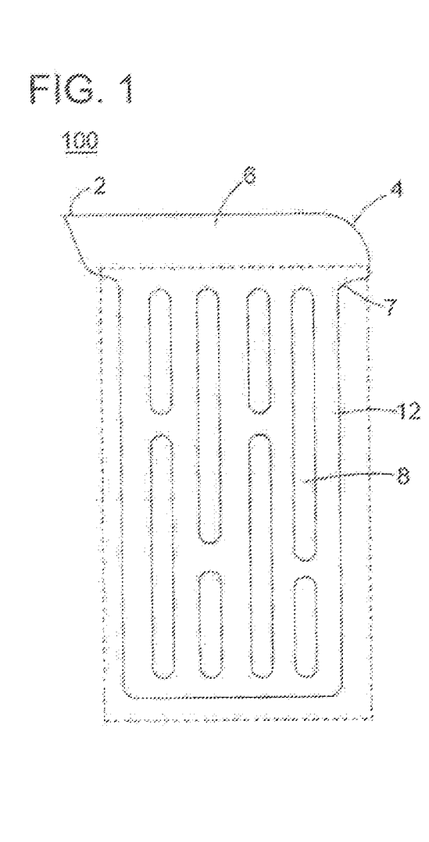
FIG. 1 depicts an embodiment of a sponge scraper insert.

FIG. 1 shows a front view of a sponge scraper insert forming the scraper layer 100. Scraper layer 100 comprises a support structure body 12 and a substantially flat scraper edge portion 6 at a terminal end thereof, with an intermediate region 7 therebetween.

Figure 2:
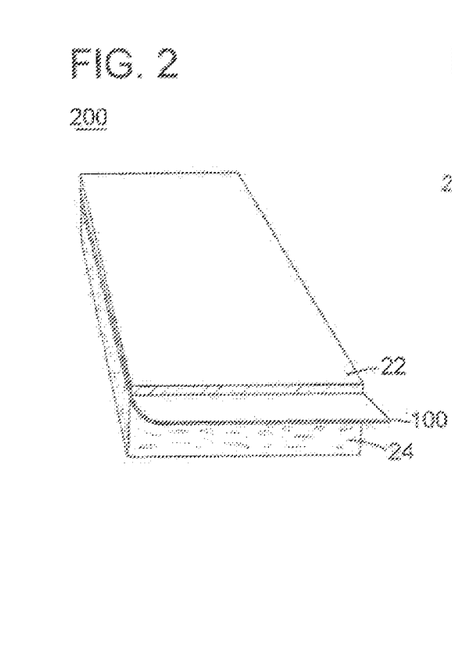
FIG. 2 is a perspective view of an integrated scraper-sponge including the insert shown in FIG. 1.
Figure 3:
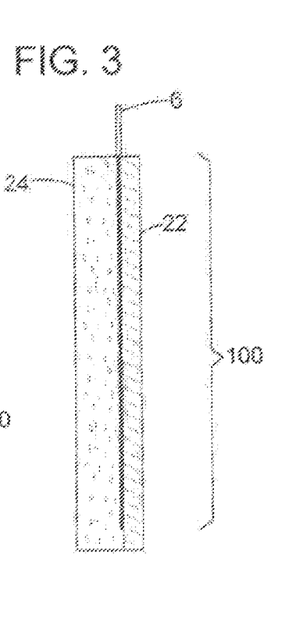
FIG. 3 is a side view of an integrated scraper-sponge including the insert shown in FIG. 1.

Referring to FIG. 2 and FIG. 3, the scraper layer 100 is positioned on the interior of the integrated scraper-sponge 200. Scraper layer 100 is firmly secured between a top layer 22 and a bottom layer 24 so that scraper edge portion 6 can optimally be used to remove solidified or other contaminants, such as dried food particles, certain paints, clays, etc. that can be encountered during everyday household cleaning. When the layers are mated at an interface between the sponge layers, a sponge body is formed having a first surface (the outer surface of the first sponge layer 22), and a second surface (the outer surface of the second sponge or scrub layer 24). Further, a continuous side surface around the perimeter is defined. In the embodiments shown, the scraper edge portion 6 extends from one of the edges of the prismatic shaped sponge, also referred to as a section of the continuous side surface of the sponge.

Scraper layer 100 is generally fabricated from a single monolithic material with, in certain embodiments, apertures 8 interspersed throughout the support structure body 12 of the scraper layer 100. In addition, in certain embodiments, the top extending portion of the layer 100, including the flat scraper edge portion 6 and the intermediate portion 7 that is slightly within the end of the sponge, is of increased thickness, and is formed of unitary construction with the remainder of the body 12.

In certain embodiments, one terminal end of the scraper edge portion 6 includes a pointed corner 2 that can be used to access tight areas with sharp edges, areas with thin grooves, or other hard to access points of common household or industrial items. On the opposing terminal end of scraper edge portion 6, a curved corner 4 is provided, which is adapted to conform to curves of household or industrial items, such as pots and pans.

Figure 16:
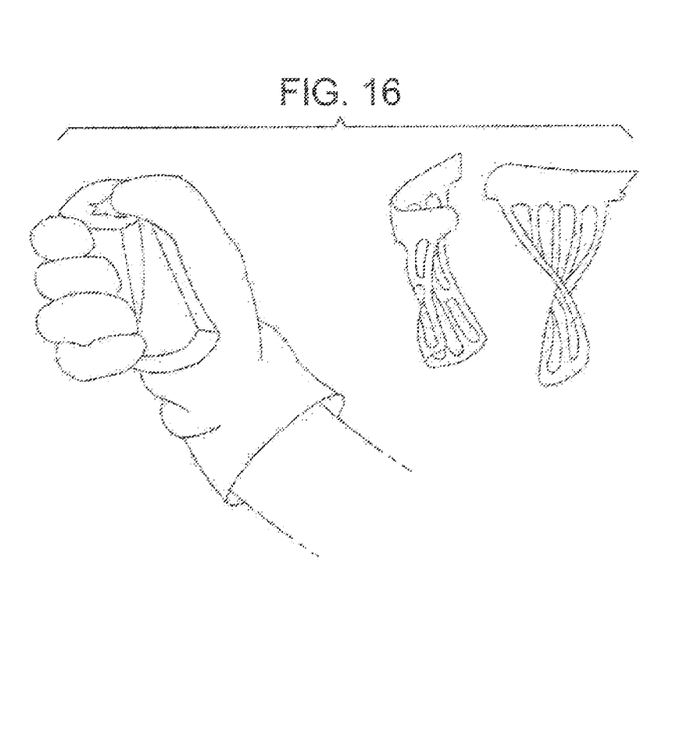
FIG. 16 depicts wringing of an integrated scraper-sponge and the flexing of the scraper layer.

The apertures and overall structure of the monolithic scraper layer 100 allow it to be easily folded, twisted and scrunched, e.g., depicted in FIG. 16, without structurally comprising the scraper layer 100, and to accommodate wringing and squeezing of the integrated scraper-sponge 200 described herein. Further, apertures 8 enhance the structural integrity of the integrated scraper-sponge 200 by increasing direct adhesion between layers 22, 24. Further, apertures 8 within the support structure body 12 also allow the sponge material to expand, when moisture is retained in the pores of the sponge, and contract when moisture is removed, without negatively impacting connection to top layer 22 and bottom layer 24.

As noted, apertures 8 improve the flexibility of the sponge scraper insert. This flexibility allows the integrated scraper-sponge 200 to be flexed to optimally remove (i.e., wring out) water, soap or contaminants from the integrated scraper-sponge 200 by squeezing and twisting the integrated sponge scraper, shown in FIG. 16.

Figure 14:
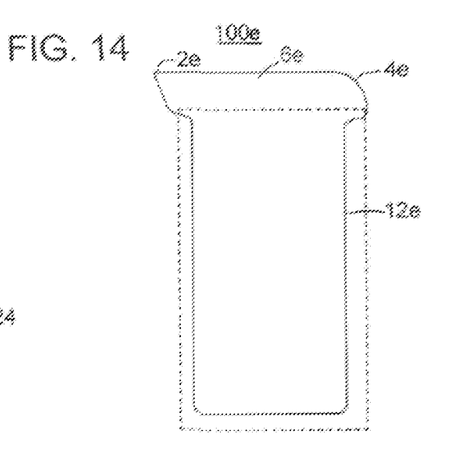
FIG. 14 depicts an additional embodiment of a sponge scraper insert.

As shown with respect to FIG. 14, a flexible scraper layer 100e can be used instead of layer 100 in FIGS. 2-3, and is provided without apertures. The dimensions of the support structure body 12e encompass a substantial portion of the interface between the sponge layers to ensure strong adhesion between the layers 22, 24.

The apertures 8 are shown as contained within the perimeter of body 12 formed by three sides and the intermediate region 7. As shown in FIG. 1, the apertures 8 are open slots, with adjacent slots in a staggered relationship. The slots in the embodiment of FIG. 1 are shown running generally parallel to the length of the sponge. This arrangement permits flexibility of the sponge, facilities drying, and provides space to accommodate dimensional changes over time as the cellulose layer dries and the body shrinks, as is known in sponges.

Figure 7:
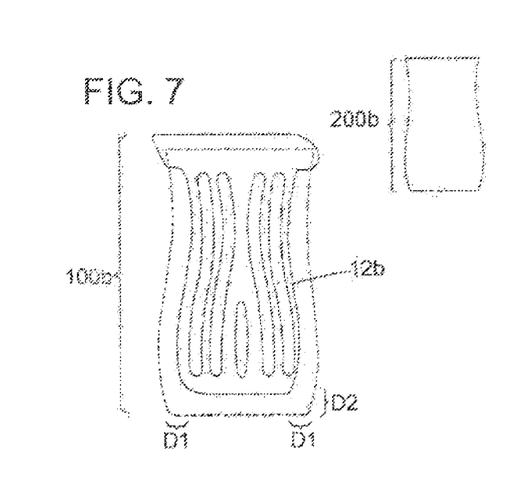
FIG. 7 depicts a further embodiment of a sponge scraper insert.
Figure 11:
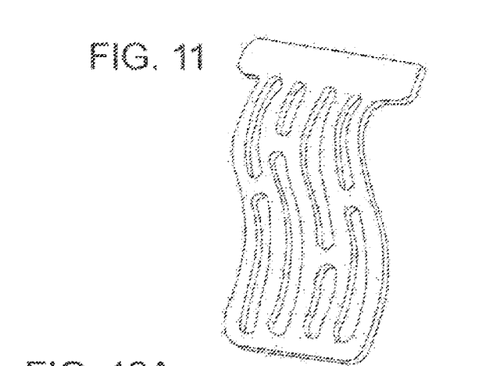
FIG. 11 depicts a further embodiment of a sponge scraper insert.

In additional embodiments, the apertures can be holes. In further embodiments, as shown in FIGS. 7 and 11, the apertures can be slots that are not parallel, but rather curved to accommodate the shape of the sponge, for instance.

The pattern of the apertures and total void area can be any suitable pattern or area to balance the necessary strength with the requisite flexibility. For instance, the area of the void in the body 12 portion of the inserts (that is, not including the intermediate portion 7 connected to the edge 6 that extends into the sponge, which in certain embodiments is provided without apertures) is in the range of about 20-80%, 20-70%, 20-60%, 20-50%, 30-80%, 30-70%, 30-60%, 30-50%, 40-80%, 40-70%, or 40-60%. The openings enhance the structural bond between layers 22, 24, as the material of the layers can be directly bonded to each other. The remainder of the material in the body 12 provides the structural integrity to the insert layer and allows it to remain stable when in use as a scraper.

Scraper layer 100 is has an effective thickness to provide sufficient flexibility at the interior of the sponge 200 with the support structure body 12, e.g., to permit twisting as shown in FIG. 16, and less flexibility at the scraper edge portion 6 to provide sufficient rigidity for scraping.

Herein, in reference to integrated scraper-sponge 200, the term "effective width" refers to the side in the direction substantially parallel to the flat scraper edge portion 6 and the term "effective length" refers to the side in the direction substantially perpendicular to the flat scraper edge portion 6. This usage accommodates sponges that are not rectangular, for instance, as shown in FIGS. 4-6 and 7.

In certain embodiments, for instance for a household, handheld sponge in the range of about 4-5 inches in length, and 2-3 inched in width, using scraper layer 100 including apertures creating a void to material ratio in the range of about 20:80 to about 80:20, the thickness of the body 12 is in the range of about 0.015 to 0.05 inches, 0.015 to 0.04 inches, 0.015 to 0.03 inches, 0.015 to 0.025 inches, 0.018 to 0.05 inches, 0.018 to 0.04 inches, 0.018 to 0.03 inches, 0.018 to 0.025 inches, 0.02 to 0.05 inches, 0.02 to 0.04 inches, 0.02 to 0.03 inches, or 0.02 to 0.025 inches. The scraper edge portion 6 has a thickness at its thickest point (which can taper to provide a scraping edge) of about 0.03 to 0.1 inches, 0.03 to 0.08 inches, 0.03 to 0.06 inches, 0.03 to 0.05 inches, 0.036 to 0.1 inches, 0.036 to 0.08 inches, 0.036 to 0.06 inches, 0.036 to 0.05 inches, 0.04 to 0.1 inches, 0.04 to 0.08 inches, 0.04 to 0.06 inches, or 0.04 to 0.05 inches.

In certain embodiments, the width and length of the integrated scraper-sponge 200 are optimized for a human's hand. As noted above, these can be similar in dimension to handheld sponge in the range of about 4-5 inches in length, 2-3 inches in width, and about 0.5-1 inch in thickness. However, it is to be appreciated that the dimensions of the sponge can vary, for instance, to a larger size in the range of about 5-9 inches in length, 3-5 inches in width, and about 1-2 inch in thickness.

Figure 4:
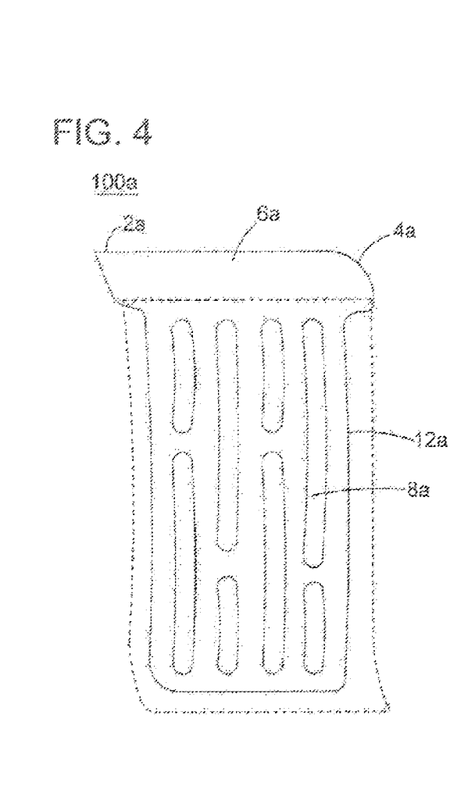
FIG. 4 depicts another embodiment of a sponge scraper insert.
Figures 5, 6:
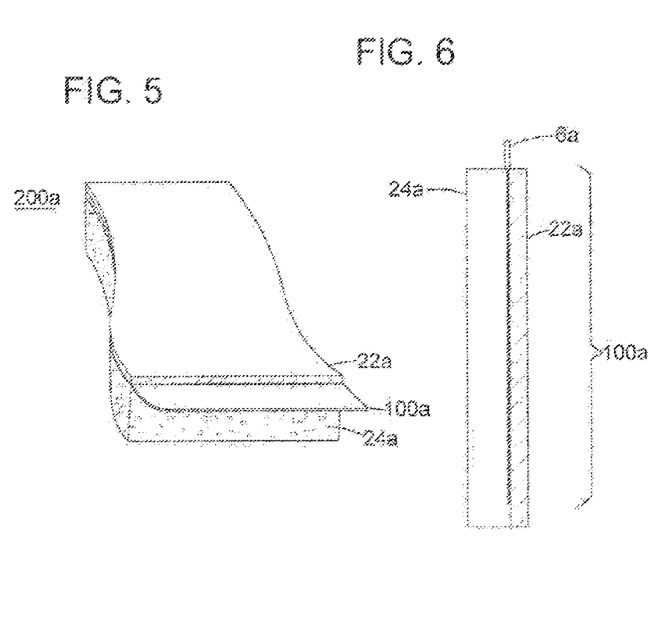
FIG. 5 is a perspective view of an integrated scraper-sponge including the insert shown in FIG. 4.
FIG. 6 is a side view of an integrated scraper-sponge including the insert shown in FIG. 4.

The area of the body 12 as shown in FIG. 1, 12a as shown in FIG. 4,12b as shown in FIG. 7, and 12e as shown in FIG.

14 (which for explanation includes the slight portion of the scraper edge portion 6 that is within the boundary defined by the edge of the sponge) can be a major portion of the overall area of the interface at the sponge layers 22, 24. Such a major portion of the interface can be greater than about 50%, or in certain embodiments in the range of about 53-85%, 53-78%, 53-71%, 60-85%, 60-78%, 60-71%, 63-85%, 63-78%, 63-71%, 66-85%, 66-78%, or 66-71%.

With reference to FIG. 7, a body 12b and extends from the top edge of the sponge to the opposite edge of the sponge, and across the width of the sponge, to leave a distance of D1 along the effective length of the sponge, and a distance of D2 along the effective width of the sponge opposite the scraper edge portion 6. Such dimensions are suitable to maintain the major portion area described above for the embodiments of FIGS. 1, 4, 7 and 14. In certain embodiments, D1 and D2 are the same, and in other embodiments D1 and D2 are different. D1 can be in the range of about 6-16%, 6-12%, 8-16%, 8-12%, or 9-11% relative to the effective width, and D2 can be in the range of about 3-9%, 3-7%, 4-9%, 4-7%, or 4-6% relative to the effective length.

Furthermore, intermediate portion 7 between scraper edge portion 6 and body 12 extends inside the end of the integrated scraper-sponge 200 an effective amount to retain the structural integrity and prevent hinging or "flopping" of the scraper edge portion 6 at the edge of the integrated scraper-sponge 200. For instance, for a handheld sponge in the range of about 4-5 inches in length, 2-3 inches in width, and about 0.5-1 inch in thickness, intermediate portion 7 can extend into the sponge in the range of about 0.08 to 0.3 inches, 0.08 to 0.25 inches, 0.08 to 0.15 inches, 0.08 to 0.2 inches, 0.1 to 0.3 inches, 0.1 to 0.25 inches, 0.1 to 0.2 inches, or 0.1 to 0.15 inches.

The scraper edge portion 6 extends from the edge of the sponge surface an effective distance to permit use as a scraper. In certain embodiments, the length extended is at least the thickness of the thicker layer 22 or 24, so as to minimize or avoid interference with a corner edge of the sponge when in use as a scraper due. For instance, for a handheld sponge in the range of about 4-5 inches in length, 2-3 inches in width, and about 0.5-1 inch in thickness, the scraper edge portion 6 can extend from sponge in the range of about 0.2 to 0.6 inches, 0.2 to 0.45 inches, 0.3 to 0.6 inches, 0.3 to 0.45 inches, 0.4 to 0.6 inches, or 0.4 to 0.45 inches.

Figure 8:
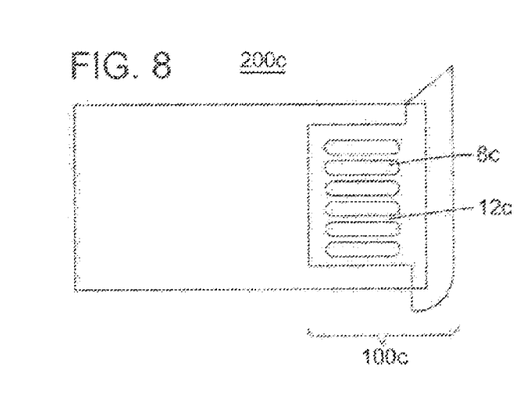
FIG. 8 depicts an additional embodiment of an integrated scraper-sponge.
Figure 9A:
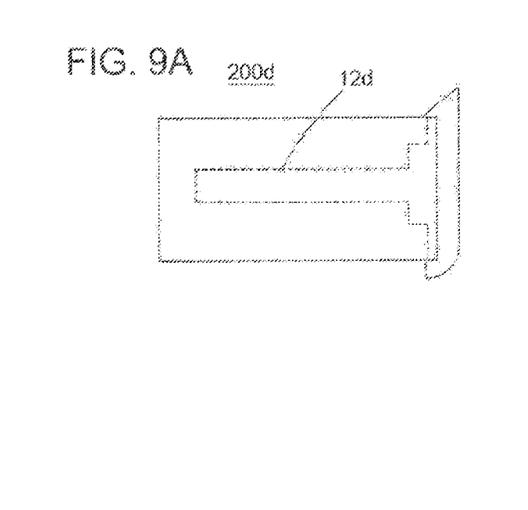
FIG. 9A and FIG. 9B depict a further embodiment of an integrated scraper-sponge.
Figure 9B:
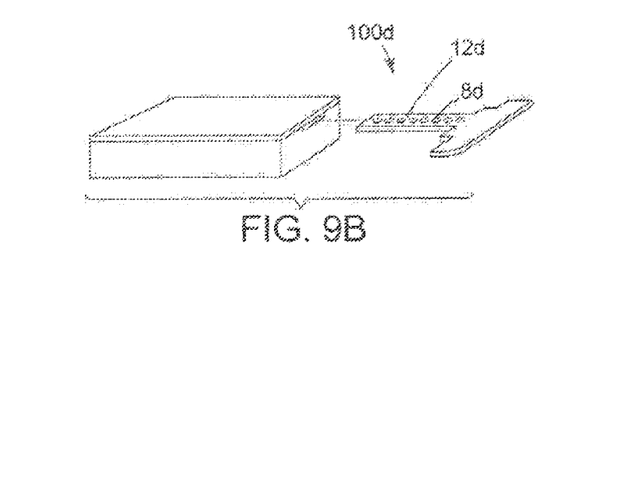

FIGS. 8, 9A and 9B depict how the length and width of scraper layer 100 can vary. In certain embodiments, the length of the scraper layer 100c can be significantly less than the overall length of the integrated scraper-sponge 200c, for instance, less than 50% of the length of the integrated scraper-sponge 200c, as generally shown in FIG. 8, for instance, in the range of about 20-50%, 20-40%, 25-50% or 25-40% of the length of the integrated scraper-sponge 200c, while being of a similar effective width as the embodiments in FIGS. 1, 4, 7 and 14.

In certain embodiments, for instance, with reference to FIGS. 9A and 9B, the width of scraper layer 100 can vary. In such embodiments, the width of the scraper layer 100 can be less than 50% of the length of the integrated scraper-sponge 200, as generally shown in FIGS. 9A and 9B, for instance, in the range of about 20-50%, 20-40%, 25-50% or 2540% of the width of the integrated scraper-sponge 200, while being of a similar effective length as the embodiments in FIGS. 1, 4, 7 and 14. In the embodiments of FIGS. 8 and 9A-9B, apertures 8c, 8d within the body 12c, 12d, respectively, are provided to enhance the structural connection between layers.

The material of the flexible scraper insert is selected so that at an effective thickness, the scraper edge portion 6 is sufficiently flexible to be capable of bending to adapt to slight curves of household items, such as the interior of cooking implements, but of rigidity to maintain its shape during scraping. The selected material shall also be compatible with the manner in which the flexible scraper insert is secured between the sponge layers, such as with reflective adhesive, thermodynamic fusing, or other suitable methods. For instance, to attach layers 22, 24 with the body 12 of layer 10 therebetween, moisture cured polyurethane adhesives are known. In these processes, the cellulose material remains moist during manufacturing with a magnesium chloride solution, as is known in the industry.

In certain embodiments, flexible scraper layer 100 can be made of various materials, including but not limited to, high density poly-ehtylene (HDPE), food grade plastic, antimicrobial microban plastic, colorbatch microban plastic, polyethylene terephthalate, polyvinyl chloride, polypropylene, TPU 92A-1, biovinyl or other suitable materials. Scraper layer 100 can also be made of thin-memory metal, including aluminum, or other suitable metals. In certain embodiments, the scraper insert can be cut and formed from a mesh sheet, a film or other similarly thin material configuration. In further embodiments the scraper insert can be molded.

The material of construction for the scraper insert can be selected to sustain the temperatures and conditions of conventional microwaves and dishwashers for cleaning. In certain other embodiments, the scraper insert can be made of material that can be advantageously made of low-cost, single-use, and disposable material.

In addition, in certain embodiments the connection between layers 22, 24, and intermediate portion 7, where in certain embodiments no apertures are present, is enhanced with another adhesive. In embodiments HDPE is used, which is a low energy surface plastic, compatible adhesives include pressure sensitive adhesives for low surface energy plastics in spray, film or tape form available from Avery Dennison. or structural weld adhesives such as those available from 3M (e.g., Scotch-Weld™ Structural Plastic Adhesive DP8005 or Scotch-Weld™ Structural Plastic Adhesive DP8010 Blue).

The layers 22, 24 can be the same or different materials, and can be the same or different thicknesses. For instance, either or both layers can be cellulose sponge material, melamine foam sponge material, or nylon scrubbing material.

In certain embodiments, sponge top layer 22 can be nylon or other suitable scrubbing pad material, which is placed on top of the scraper layer 100. Underneath the scraper layer 100 is sponge bottom layer 24, which can be cellulose or melamine sponge material.

In certain embodiments, instead of or in conjunction with adhesive between layers, the insert is fused by molding or melting to the scrub layer before gluing both the scrub with the fused-scraper onto the cellulose or foam sponge layer.

The flexible plastic body can be a mesh or film of thinner material continuing into the scraper head, which can facilitate adhesion and/or or fusion of the layers as described above.

In certain embodiments the edge along the effective length can be straight (e.g., a prismatic-shaped sponge) or curved (e.g., as shown FIGS. 4-6, with a sigmoid curve shape), as in commercially available sponges. Layer 100 can be congruent with the overall shape of the sponge 200, or different than the shape of the sponge 200.

Referring to FIG. 7, the shape of support structure 12b can vary depending on the shape of the integrated scraper-sponge 200b. Various shapes can be used and, in certain embodiments, can be constructed in shape and size to ergonomically fit to a user's single hand use or two hand use of the integrated scraper-sponge 200b. For instance, as shown in FIG. 7, one end has an effective width that is larger than the opposite end.

Figure 10:
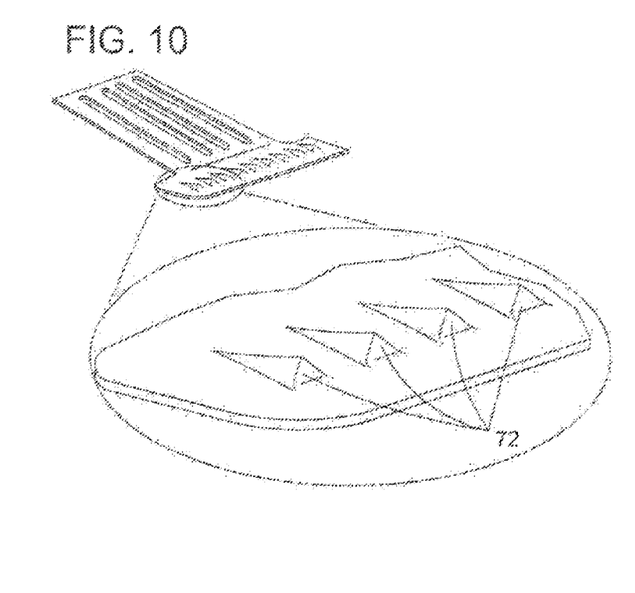
FIG. 10 depicts another embodiment of a sponge scraper insert.

Referring to FIG. 10, in certain embodiments the flexible scraper layer 100 comprises protruding ridges 72 on a face of scraper edge portion 6. With further reference to FIG. 10, in certain embodiments these ridges 72 can be a prism shape, however it should be understood that any shaped ridges can be effective, including but not limited to, rectangular, cone, tetrahedron, pyramid and the similar shapes.

The protruding ridges 72 on the face of the scraper edge portion 6 advantageously allow scraping of difficult to remove contaminants. The protruding ridges 72 magnify pressure the user applies to the surface of the contaminates by decreasing the surface area over which the force is applied, therefore increasing the removal of the contaminates. The protruding ridges 72 also increase the efficiency of the water and soap on the household item contaminants by scoring and chipping away at the contaminants thereby increasing the surface area for the water and soap to act upon.

Figures 12A, 12B, 12C:
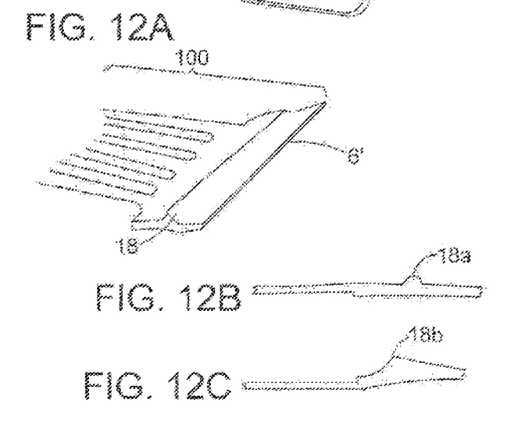
FIGS. 12A-12C depict further embodiments of sponge scraper inserts.

Referring to FIGS. 12A, 12B and 12C, in certain embodiments scraper edge portion 6' can include a stabilizing ridge 18. Stabilizing ridge 18 provides additional support and increased rigidity of scraper edge portion 6'. In further reference to FIGS. 12B and 12C, the stabilizing ridge 18 can comprise a rounded top (18a), pointed top (18b) or other suitable shapes that would be known by a person having ordinary skill in the art.

Figure 13A:
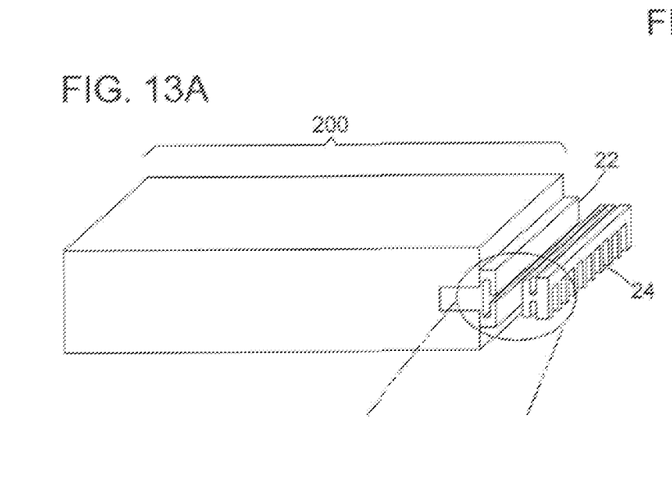
FIGS. 13A-13C depict a further embodiment of a sponge scraper insert with a removable scraper portion.
Figure 13B:
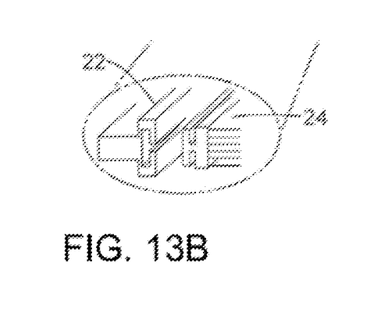
Figure 13C:
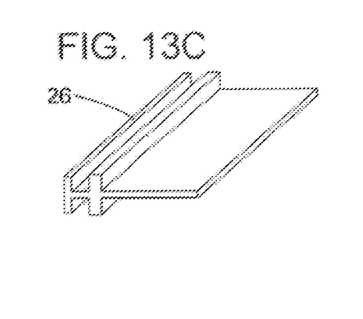

FIGS. 13A, 13B and 13C illustrates certain embodiments in which a scraper portion includes a flexible scraper sponge insert slot 22 configured and arranged to attach to optional scraper portion attachments 24, 26. Flexible scraper sponge insert slot 22 can be attached to any of the support structure body 12 configurations as described herein, which include various dimensions, aperture patterns and sizes, materials, and all other embodiments described.

Scraper portion attachments 24, 26 can include, but is not limited to, scraper portion insert 26, which is substantially similar to scraper edge portion 6, brush attachments 24, or an insert which contains protruding ridges 72 as shown in FIG. 10, or any other attachments that a person having ordinary skill in the art would understand to be advantageous to cleaning.

Figure 15:
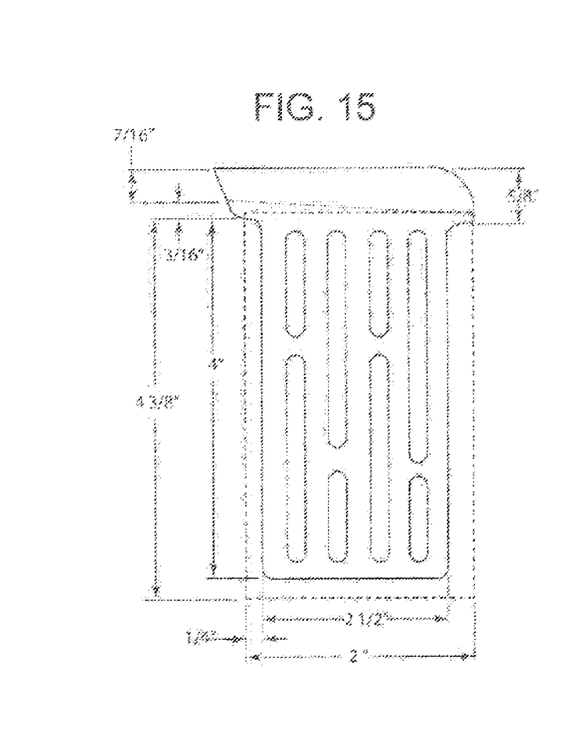
FIG. 15 depicts an embodiment of an integrated scraper-sponge with exemplary dimensions.

Referring to FIG. 15, dimensions of one embodiment of the scraper layer 100 are shown. However, it should be understood that this is just one embodiment and should not be interpreted as limiting in any way.

Figures 17A, 17B, 17C:
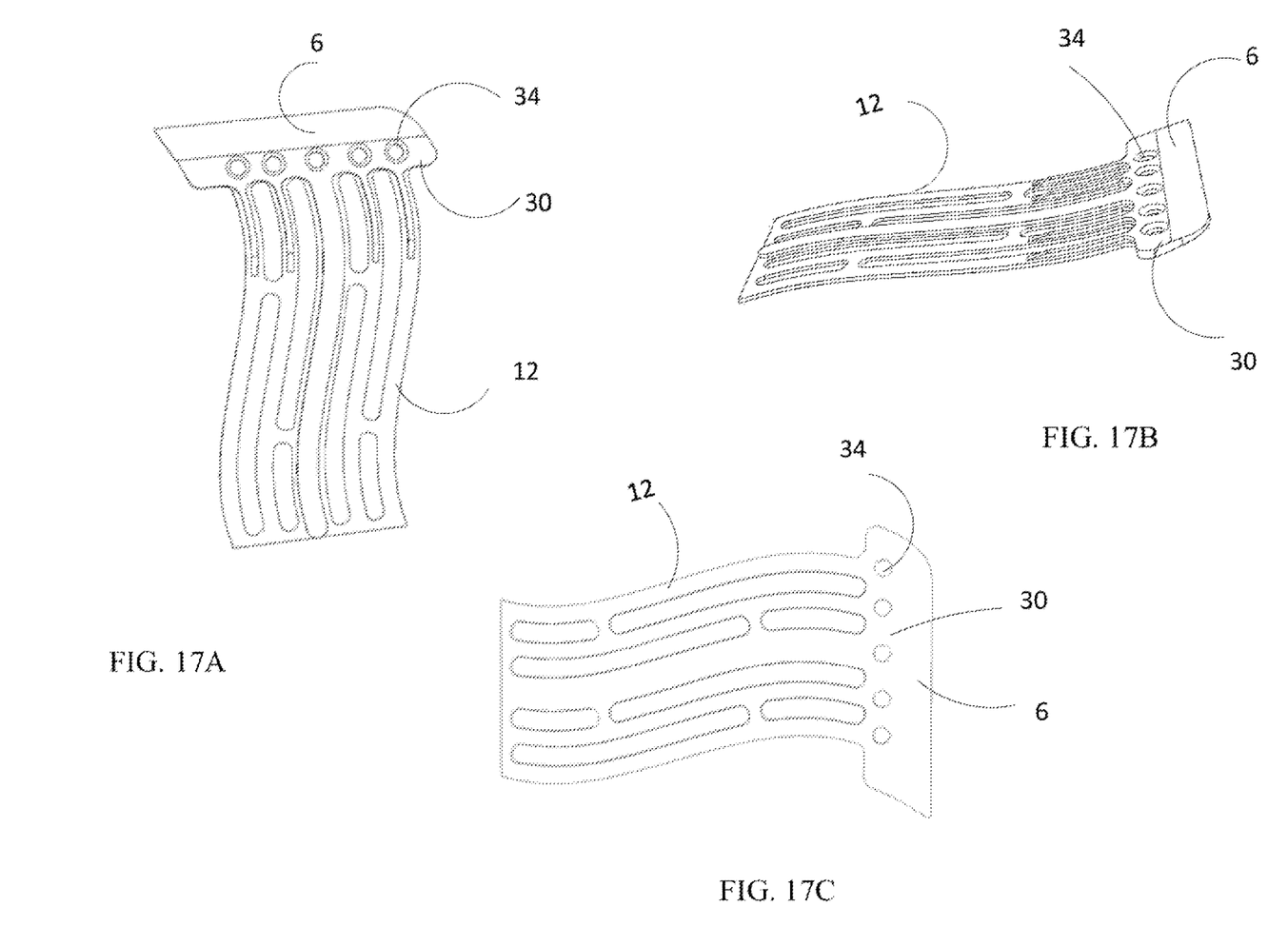
FIGS. 17A-17C depict several views of a further embodiment of a scraper layer insert having a plurality of apertures.

Referring now to FIGS. 17A-17C, a further embodiment of a scraper-sponge support structure body is illustrated. Specifically, FIG. 17A shows a top view, FIG. 17B shows a perspective view, and FIG. 17C shows a bottom view. The exemplary support structure body 12 has the addition of a distal portion 30. The distal portion 30 is placed between the intermediate portion 7 as previously shown and between the scraper edge portion 6. The distal portion 30 comprises a plurality of openings 34. However, it cannot be excluded that the distal portion 30 may comprise a single opening.

The distal portion with openings is configured to provide additional rigid support at the scraper portion end. The openings are configured to allow the passage of viscous and semi-rigid substances to pass through the scraper support structure body, thereby reducing resistance and facilitating easier cleaning and easier manufacturing. The openings may be circular or polygonal.

For example, the openings may prevent the buildup of either liquid or dried glue. Other debris may be captured by the openings. In some embodiments, the openings are exposed from the sponge layers; however, in other embodiments, the openings may be concealed by at least one sponge layer in the scraper-sponge apparatus.

Figure 18:
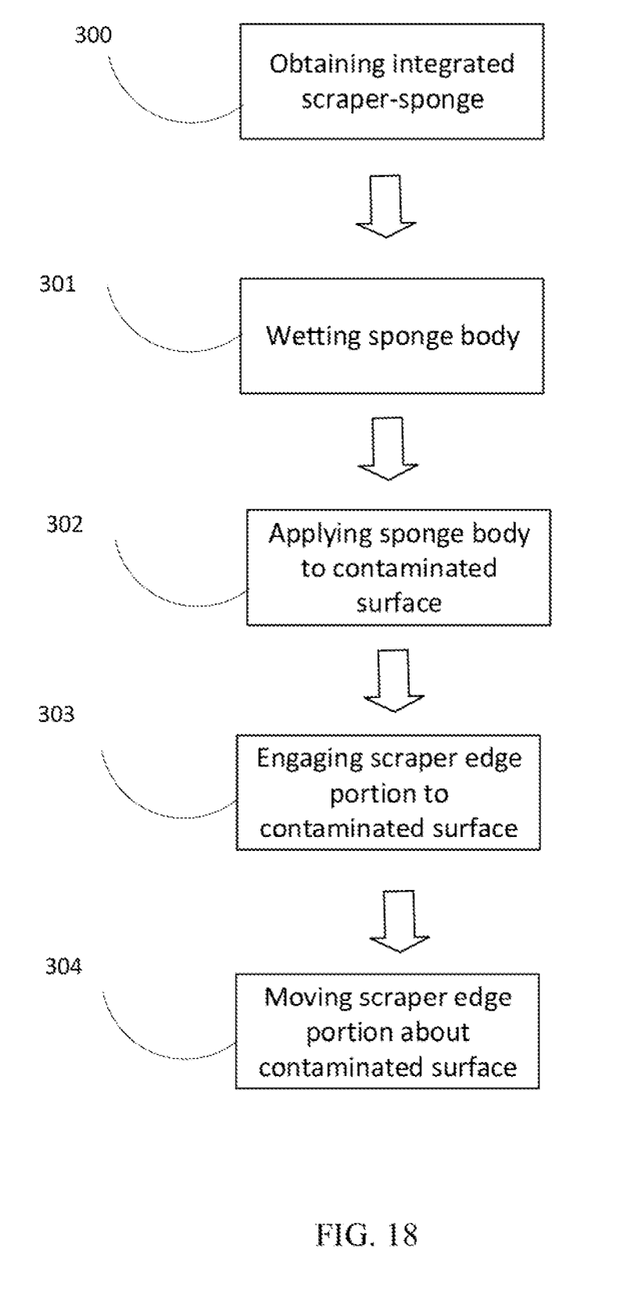
FIG. 18 depicts exemplary method steps for using an integrated scraper-sponge.

Turning now to FIG. 18, exemplary method steps in numerals 300, 301, 302, 303, and 304 are depicted. A person may use an exemplary scraper-sponge apparatus to loosen or remove residue from a surface. For example, a person may wet the sponge body of an exemplary scraper-sponge, apply the sponge body to a surface to loosen residue. A person may apply or engage the scraper edge to the surface to further loosen or remove residue from the surface.

Exemplary scraper-sponge apparatuses may be used wet or dry. Exemplary scraper-sponge apparatuses may be used in connection with any cleaning fluids suitable for loosening or removing residue from a surface. A surface may be a household countertop, floor, indoor and outdoor furniture, grills, machines, vehicles, boats, garages, or any industrial surface to be cleaned.

The methods and systems of the present invention have been described above and in the attached drawings; however, modifications will be apparent to those of ordinary skill in the art and the scope of protection for the invention is to be defined by the claims that follow.

What is claimed is:

1. A method of using an integrated scraper-sponge comprising:
    a first sponge layer of absorbent material and a second sponge or scrub layer of absorbent material or abrasive material, the first and second layers mated to one another at an interface and being configured and dimensioned to define a sponge body having a first surface being a surface of the first sponge layer and a second surface being a surface of the second sponge or scrub layer, and a continuous side surface around the perimeter;
    and
    a scraper layer fixed between the first and second layers at the interface thereof, wherein the scraper layer includes
        a scraper edge portion protruding outwardly from a section of the continuous side surface of the sponge body,
        a support structure body having an area configured and dimensioned to fit between at least a major portion the interface,
        a plurality of apertures within the area of the support structure body perimeter defining the interface of the first and second layers,
        an interface portion between the scraper edge portion and the support structure body that is within the sponge body, and
        a distal portion having a plurality of openings between an intermediate region and the scraper edge portion;
    the method steps comprising:
        obtaining the scraper-sponge,
        wetting the sponge body,
        applying the sponge body to a contaminated surface to loosen residue,
        engaging the scraper edge portion to the contaminated surface, and moving the scraper edge portion about the contaminated surface.

2. A method of using an integrated scraper-sponge comprising:
a first sponge layer of absorbent material and a second sponge or scrub layer of absorbent material or abrasive material, the first and second layers mated to one another at an interface and being configured and dimensioned to define a sponge body having a first surface being a surface of the first sponge layer and a second surface being a surface of the second sponge or scrub layer, and a continuous side surface around the perimeter;
and
a scraper layer fixed between the first and second layers at the interface thereof, wherein the scraper layer includes
a scraper edge portion protruding outwardly from a section of the continuous side surface of the sponge body,
a support structure body having an area configured and dimensioned to fit between at least a major portion the interface,
an interface portion between the scraper edge portion and the support structure body that is within the sponge body, and
a distal portion having a plurality of openings placed between an intermediate region and the scraper edge portion;
the method steps comprising:
obtaining the integrated scraper-sponge,
wetting the sponge body,
applying the sponge body to a contaminated surface to loosen residue,
engaging the scraper edge portion to the contaminated surface, and
moving the scraper edge portion about the contaminated surface.

3. A method of using an integrated scraper-sponge comprising:
a first sponge layer of absorbent material and a second sponge or scrub layer of absorbent material or abrasive material, the first and second layers mated to one another at an interface and being configured and dimensioned to define a sponge body having a first surface being a surface of the first sponge layer and a second surface being a surface of the second sponge or scrub layer, and a continuous side surface around the perimeter;
and
a scraper layer fixed between the first and second layers at the interface thereof, wherein the scraper layer includes
a scraper edge portion protruding outwardly from a section of the continuous side surface of the sponge body,
a support structure body having an area configured and dimensioned to fit between the interface,
a plurality of apertures within the area of the support structure body perimeter defining the interface of the first and second layers,
an interface portion between the scraper edge portion and the support structure body that is within the sponge body, and
a distal portion having a plurality of openings placed between an intermediate region and the scraper edge portion;
the method steps comprising:
obtaining the integrated scraper-sponge,
wetting the sponge body,
applying the sponge body to a contaminated surface to loosen residue,
engaging the scraper edge portion to the contaminated surface, and
moving the scraper edge portion about the contaminated surface.

* * * * *